United States Patent [19]

Shimizu

[11] Patent Number: 5,036,254
[45] Date of Patent: Jul. 30, 1991

[54] INVERTER HAVING A BROAD OUTPUT-CONTROL RANGE

[75] Inventor: Keiichi Shimizu, Yokohama, Japan

[73] Assignee: Toshiba Lighting & Technology Group, Tokyo, Japan

[21] Appl. No.: 406,610

[22] Filed: Sep. 12, 1989

[30] Foreign Application Priority Data

Sep. 13, 1988 [JP] Japan .................. 63-227394

[51] Int. Cl.$^5$ .......................................... H05B 37/02
[52] U.S. Cl. ............................. 315/219; 315/DIG. 5; 315/DIG. 7; 331/177 R
[58] Field of Search .......... 315/219, DIG. 5, DIG. 7; 331/112, 173, 177 R

[56] References Cited

U.S. PATENT DOCUMENTS

| 3,681,711 | 8/1972 | Hanby | 331/112 |
| 3,683,266 | 8/1972 | Ito | 331/112 |
| 4,611,150 | 9/1986 | Ball et al. | 331/112 |
| 4,745,535 | 5/1988 | Sugishima et al. | 331/112 |

FOREIGN PATENT DOCUMENTS 1571564 7/1980 United Kingdom ............... 315/219

Primary Examiner—Eugene R. LaRoche
Assistant Examiner—Son Dinh
Attorney, Agent, or Firm—Cushman, Darby & Cushman

[57] ABSTRACT

An inverter includes a DC voltage source for supplying a DC voltage. A switching transistor switches the DC voltage supplied from the DC voltage source. A parallel resonant circuit receives the DC voltage switched by the switching transistor and generates an AC output. A self-excited oscillator includes a detector for detecting at least part of the AC output from the resonant circuit for supplying the detection output between the base and emitter of the switching transistor so as to control the ON and OFF of the switching transistor and supplying a base current to the switching transistor. A variable impedance element includes a series circuit comprised of a variable resistance element and a capacitor for changing the resistance value of the variable resistance element, thereby to change the combined impedance value to change the ON period of the switching transistor. A control circuit continuously changes the resistance of the variable resistance element, thereby to change the impedance of the variable impedance element to continuously change the ON period of the switching transistor.

14 Claims, 6 Drawing Sheets

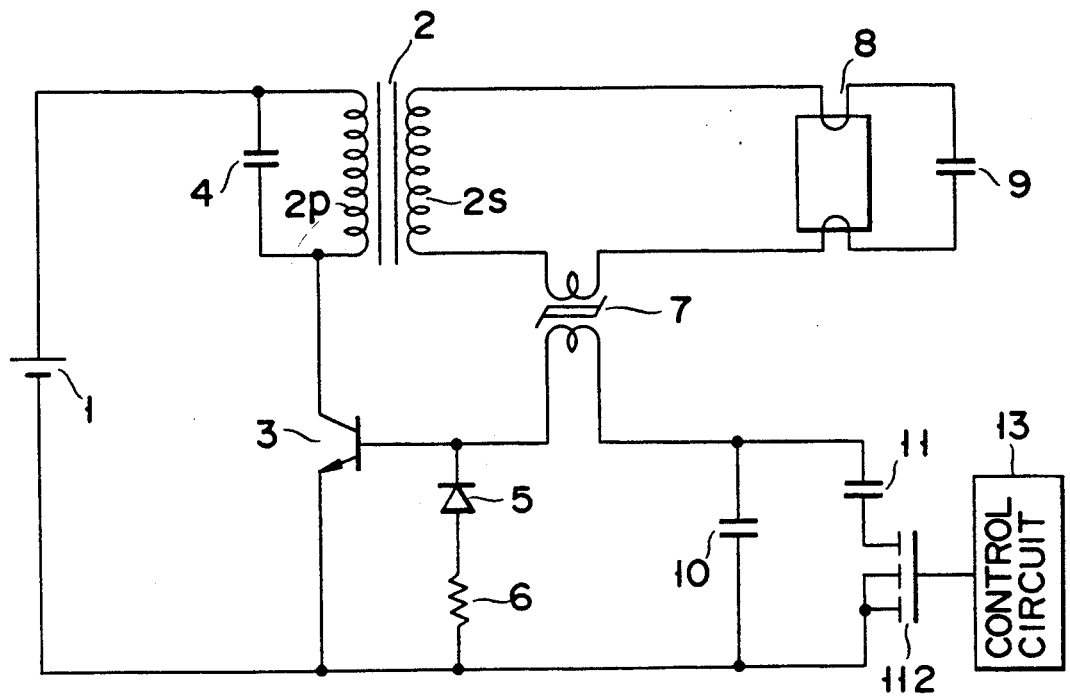
F I G. 1

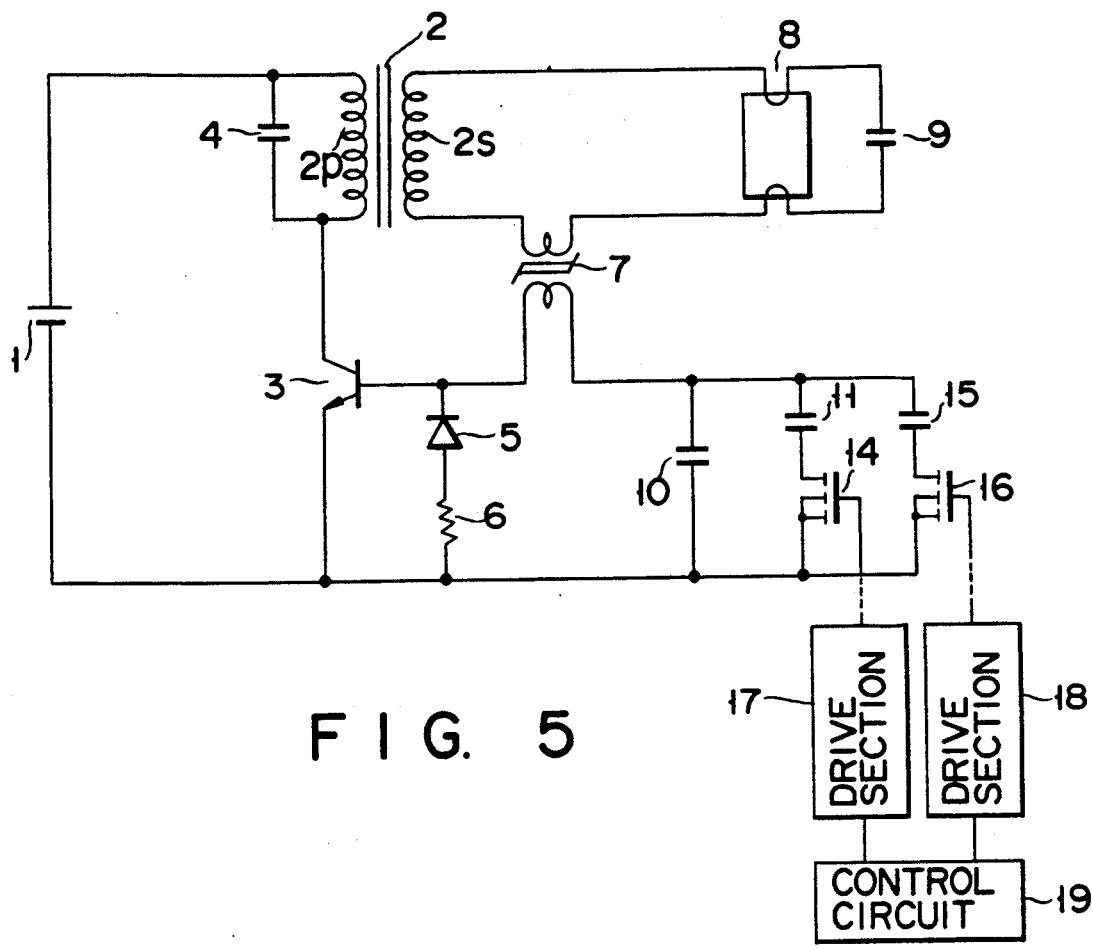
F I G. 5
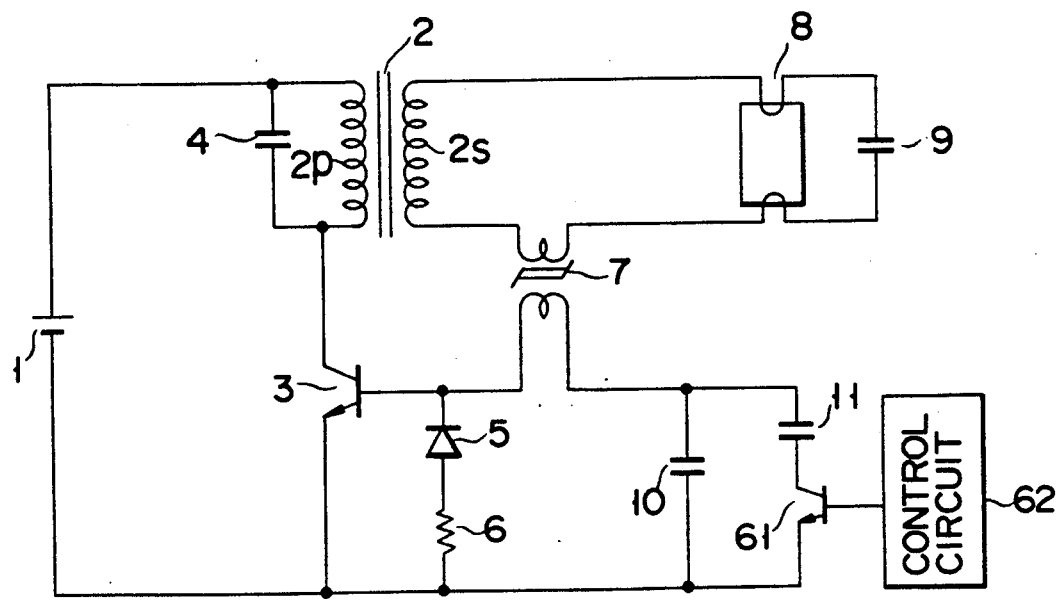
F I G. 6

INVERTER HAVING A BROAD OUTPUT-CONTROL RANGE

BACKGROUND OF THE INVENTION

1. Field of the Invention

The present invention relates to a self-excited, one-transistor inverter, and more particularly to an inverter for use in a discharge lighting device that provides high-frequency lighting of a discharge lamp such as a fluorescent lamp.

2. Description of the Related Art

Various types of inverters are known as devices for converting DC power to AC power. Among these is a self-excited, one-transistor, parallel resonant inverter. This inverter comprises a DC voltage source, a transistor used as a switching element, and a parallel resonant circuit. The transistor is turned on and off at a frequency as high as 20 to 100 KHz, thus applying the high-frequency voltage to the resonant circuit. The parallel resonant circuit generates an AC voltage in response to the high-frequency voltage. The AC voltage, thus generated, is applied to a load, i.e., a discharge lamp such as a fluorescent lamp, whereby the lamp is lighted.

In order to control the lighting of the lamp, to compensate for the temperature of the lamp or the inverter, to achieve a smooth start of the lighting, and to protect the lamp after a long use, it is necessary to control the output voltage of the inverter. To control the output voltage of the conventional inverter, two methods are used. The first method is to connect a capacitor to the base of the transistor and control the capacitance of this capacitor by means of a switch. The second method is to connect a variable resistor to the base of the transistor and change the resistance of this variable resistor.

When the first method is used, the output voltage of the inverter cannot be continuously changed since that kind of switch only allows a discrete change in voltage. When the second method is employed, the output voltage of the inverter cannot be controlled over a sufficiently broad range, though it can be varied continuously.

SUMMARY OF THE INVENTION

It is, therefore, an object of the present invention to provide an inverter whose output voltage can be continuously changed over a broad range.

According to the invention, there is provided, to accomplish the above object, an inverter which comprises:

DC voltage source for supplying a DC voltage;

switching transistor for switching the DC voltage supplied from the DC voltage source;

a parallel resonant circuit, including an inductor and a resonant capacitor, for receiving the DC voltage switched by the switching transistor and for generating an AC output, the resonant circuit being connected in series to the switching transistor and connected so as to be fed from the DC voltage source through the switching transistor;

self-excited oscillation means, including means for detecting at least part of the AC output from the resonant circuit, for supplying the detection output of the detecting means between the base and emitter of the switching transistor so as to control the ON and OFF of the switching transistor and for supplying a base current to the switching transistor;

variable impedance means, connected to the self-excited oscillation means and including a series circuit comprised of a variable resistance element and a capacitor, for changing the resistance value of the variable resistance element, thereby to change the combined impedance value to change the ON period of the switching transistor; and control means, connected to the variable impedance means, for continuously changing the resistance value of the variable resistance element, thereby to change the combined impedance of the variable impedance means to continuously change the ON period of the switching transistor.

BRIEF DESCRIPTION OF THE DRAWINGS

The above-mentioned aspect and other features of this invention will be apparent from the following detailed description made in conjunction with the drawings attached hereto, in which:

FIG. 1 is a circuit diagram illustrating a discharge lamp-lighting device having an inverter according to a first embodiment of the present invention;

FIG. 5 is a circuit diagram showing a discharge lamp-lighting device having an inverter according to a fourth embodiment of this invention, which is a modification of the inverter shown in FIG. 1;

FIG. 6 is a circuit diagram showing a discharge lamp-lighting device having an inverter according to a fifth embodiment of this invention, which is another modification of the inverter shown in FIG. 1.

DETAILED DESCRIPTION OF THE PREFERRED EMBODIMENTS

Figure 2:
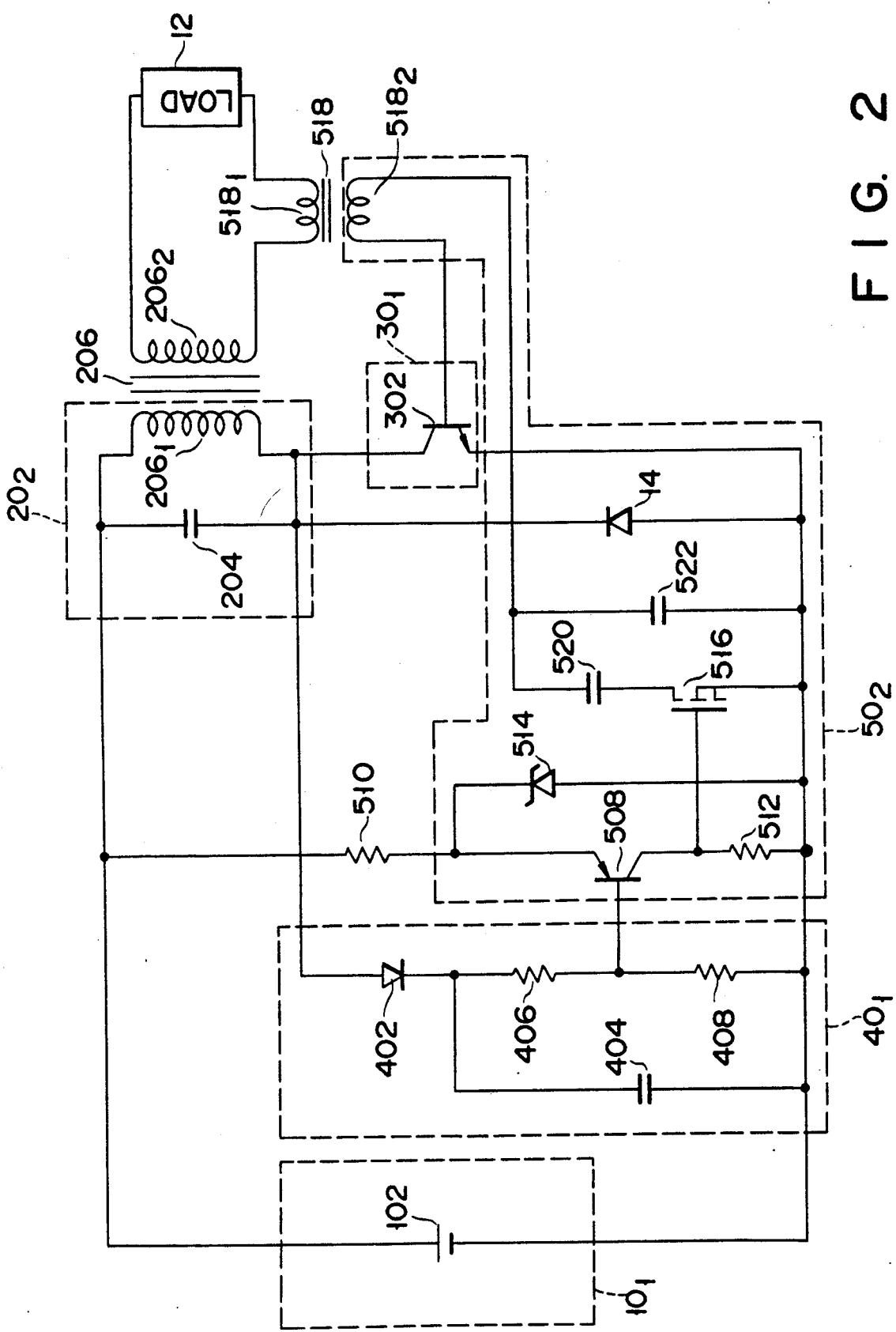
FIG. 2 is a circuit diagram showing, in detail, the control circuit incorporated in the device illustrated in FIG. 1.

Inverters according to the present invention will now be described, with reference to the accompanying drawings.

FIG. 1 is a circuit diagram showing a discharge lamp-lighting device having an inverter which is a first embodiment of the invention. As is shown in this figure, the lamp-lighting device comprises a battery 1 as a DC power source, and an output transformer 2. The battery 1 can be replaced by a rectifier for rectifying an AC, which is of smoothing, partially smoothing, or non-smoothing type. The transformer 2 has a primary winding 2p and a secondary winding 2s. One end of the primary winding 2p is connected to the positive terminal of the DC power source 1. The other end of the primary winding 2p is connected to the collector of a bipolar transistor 3 which is used as a switching element. A resonant capacitor 4 is connected in parallel to the secondary winding 2s of the transformer 2. The transformer 2 and the capacitor 4 constitute a parallel resonant circuit.

A discharge lamp 8, such as a fluorescent lamp, and a capacitor 9 for previously heating the filament of the discharge lamp 8 are connected in parallel to the secondary winding 2s of the transformer 2. A saturable current transformer (CT) 7 is connected to one end of the secondary winding 2s, for positively feeding back the current flowing through the lamp 8 or capacitor 9 to the base of the transistor 3.

Figure 7:
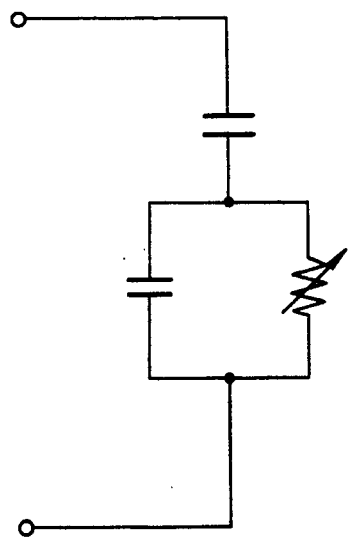
FIG. 7 is a circuit diagram showing a modification of the variable impedance circuit shown in FIG. 1.

The negative terminal of the DC power source 1 is connected to the emitter of the transistor 3. A series circuit comprised of a diode 5 and a resistor 6 is connected between the base and emitter of the transistor 3. Capacitors 10 and 11 are connected so as to control the switching frequency of the transistor 3. A field-effect transistor (FET) 112 is used as a variable impedance element (refer to the circuit shown in FIG. 7), and a control circuit 13 is connected to the gate of the FET 112, for controlling the impedance of the FET 112 in accordance with various physical quantities. The circuit construction of the control circuit 13 will be described later on.

The operation of the discharge lamp-lighting device shown in FIG. 1 will be explained. After the DC power source 1 has been turned on, a starting circuit (not shown) keeps supplying a small current (i.e., a base current) to the transistor 3, and the transistor 3 is made slightly conductive. As a result, the primary winding 2p of the output transformer 2 is slightly excited and therefore a load current flows through the secondary winding 2s. This load current is also flows through the primary winding 2p and therefore an output signal appears at the secondary winding 2s. This output signal is positively fed back to the base of the transistor 3. The transistor 3 is rapidly turned on by means of the positive feedback loop composed of its base, emitter, and the secondary winding of the CT 7.

The capacitors 10 and 11 accumulate the base current, whereby the base current of the transistor 3 decreases. As a result, the transistor 3 is rapidly turned off by means of the positive feedback loop. As this time, an AC voltage is generated in the secondary winding 2s of the output transformer 2, by virtue of the resonance of the parallel resonant circuit composed of the primary winding 2p and the capacitor 4. This AC voltage inverts the polarity of the load current, more precisely, changing the load current to a positive current. The voltage applied to the base of the transistor 3 is thereby changed to a positive one. The transistor 3 is, therefore, turned on again by means of the positive feedback loop.

As the transistor 3 is repeatedly turned on and off in the manner described above, the inverter outputs AC power to the discharge lamp 8.

Figure 3:
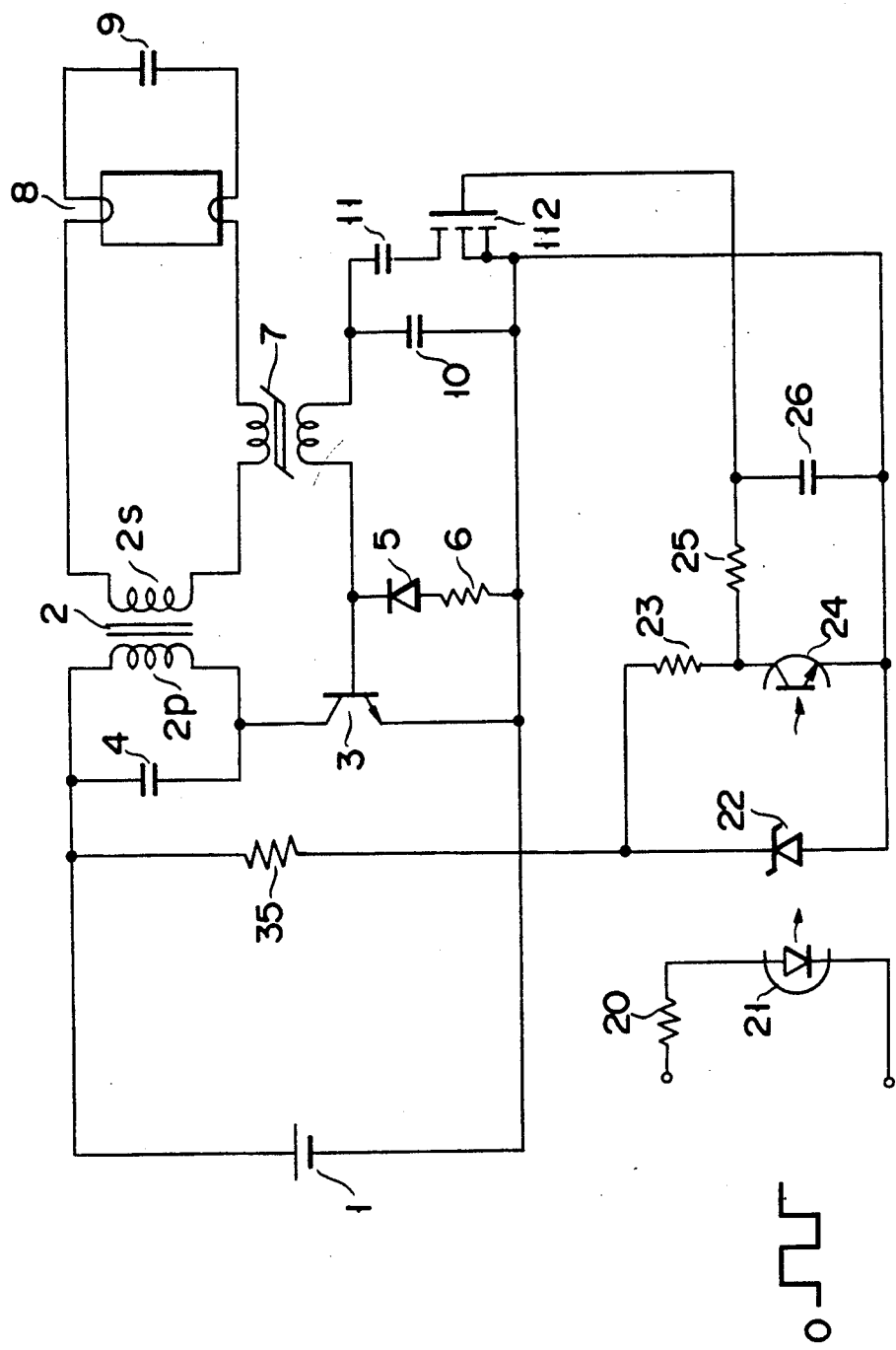
FIG. 3 is a circuit diagram showing a lighting control device having an inverter according to a second embodiment of this invention.

FIG. 2 illustrates the control circuit 13 in greater detail, and corresponds to FIG. 3 of U.S. patent application Ser. No. 284,377. As is shown in FIG. 2, the circuit 13 has a transistor 508 which is used as an error detector. The base of the transistor 508 is connected to the connection point of the resistors 406 and 408 of a peak-voltage detecting circuit $40_1$. The emitter of the transistor 508 is connected by a resistor 510 to the positive terminal of a DC power source 102 which corresponds to the DC power source 2 shown in FIG. 1. The collector of the transistor 508 is connected by a resistor 512 to the negative terminal of the DC power source 102. A zener diode 514, which functions as a reference voltage source, is connected between the emitter of the transistor 508 and the negative terminal of the DC power source 102 in a manner that its cathode faces the emitter of the transistor 508. Further, the collector of the transistor 508 is connected to the gate of the FET 516 (equivalent to reference numeral 12 of FIG. 1), the source of which is connected to the negative terminal of the DC power source 102. As for the other structural features of the control circuit 13, refer to U.S. patent application Ser. No. 284,377.

The operation of the control circuit 13, described above, will now be explained. Let us assume that, in a stationary state, the capacitor 404 of the peak-voltage detector $40_1$ is charged with a voltage $V_p$ corresponding to the peak value of the collector voltage of the transistor 302. The resistors 406 and 408 divide this voltage $V_p$, thus providing a voltage of $V_p/n$ at the base of the transistor 508. The emitter of this transistor 508 is biased to the reference voltage $V_{ref}$ which is the voltage of the zener diode 514. When $V_p > (V_{ref} - V_{BE}) \times n$, where $V_{BE}$ is the base-emitter voltage of the transistor 508, the transistor 508 is turned off and therefore FET 516 is also turned off. In this case, the capacitor 520 is cut off from other circuits, whereby only capacitor 522 is, in effect, connected to the base of the transistor 302. On the other hand, when $V_p < (V_{ref} - V_{BE}) \times n$, the transistor 508 becomes active or conductive. In this case, the FET 516 functions as a variable impedance element, and has an impedance corresponding to the collector voltage of the transistor 508. The off-period of the transistor 3 (FIG. 1) is constant since it is determined by the parallel resonance. In contrast, the on-period of the transistor 3 is variable, for the following reason. The on-period is determined by the base current of the transistor 3, which flows through the capacitors 10 and 11. This base current, in turn, is determined by the capacitor 10 and 11 connected in series to the base of the transistor 3 and also by the specific impedance of the FET 112. Thus, the on-period can be varied by changing the specific impedance of the FET 112 by means of the control circuit 13. Thus, it is possible to change the operating frequency f1 of the inverter, by controlling the on-period of the transistor 3. It is preferable that the operating frequency fall in a audible range, from 20 to 100 KHz. Nonetheless, the operating frequency need not be limited to this range.

More specifically, when the specific impedance of the FET 112 is lowered by means of the control circuit 13, a current large enough to drive the base of the transistor 3 flows through the capacitors 10 and 11 longer than before. As a result of this, the transistor 3 remains on longer, whereby the operating frequency f1 of the inverter decreases, approaching the resonance frequency f0 of the parallel resonant circuit 2.

FIG. 3 illustrates a lighting control device having an inverter according to a second embodiment of the present invention. The same components as those shown in FIG. 1 will not be described in detail. As can be understood from FIG. 3, the series circuit comprised of a resistor 20 and a light-emitting diode 21 functions as a light-emitting section for generating an optical, lighting-control signal. A zener diode 22, a resistor 23, and a phototransistor 24 constitute a light-receiving section. On end of the zener diode 22 is connected to a resistor 35. The diode 21 emits a lighting-control signal. Upon receipt of this signal, the phototransistor 24 generates a current which corresponds to the pulse width of the signal. Thus current flows from the phototransistor 24 via a resistor 25 into a capacitor 26, thus charging the capacitor 26. The voltage across the charged capacitor 26 is applied to the gate-source of an FET 112. Since the voltage corresponds to the pulse width of the lighting-control signal, the gate voltage of the FET 112 can be varied to control the lighting of a lamp 8, by changing the pulse width of the lighting-control signal.

Figure 4:
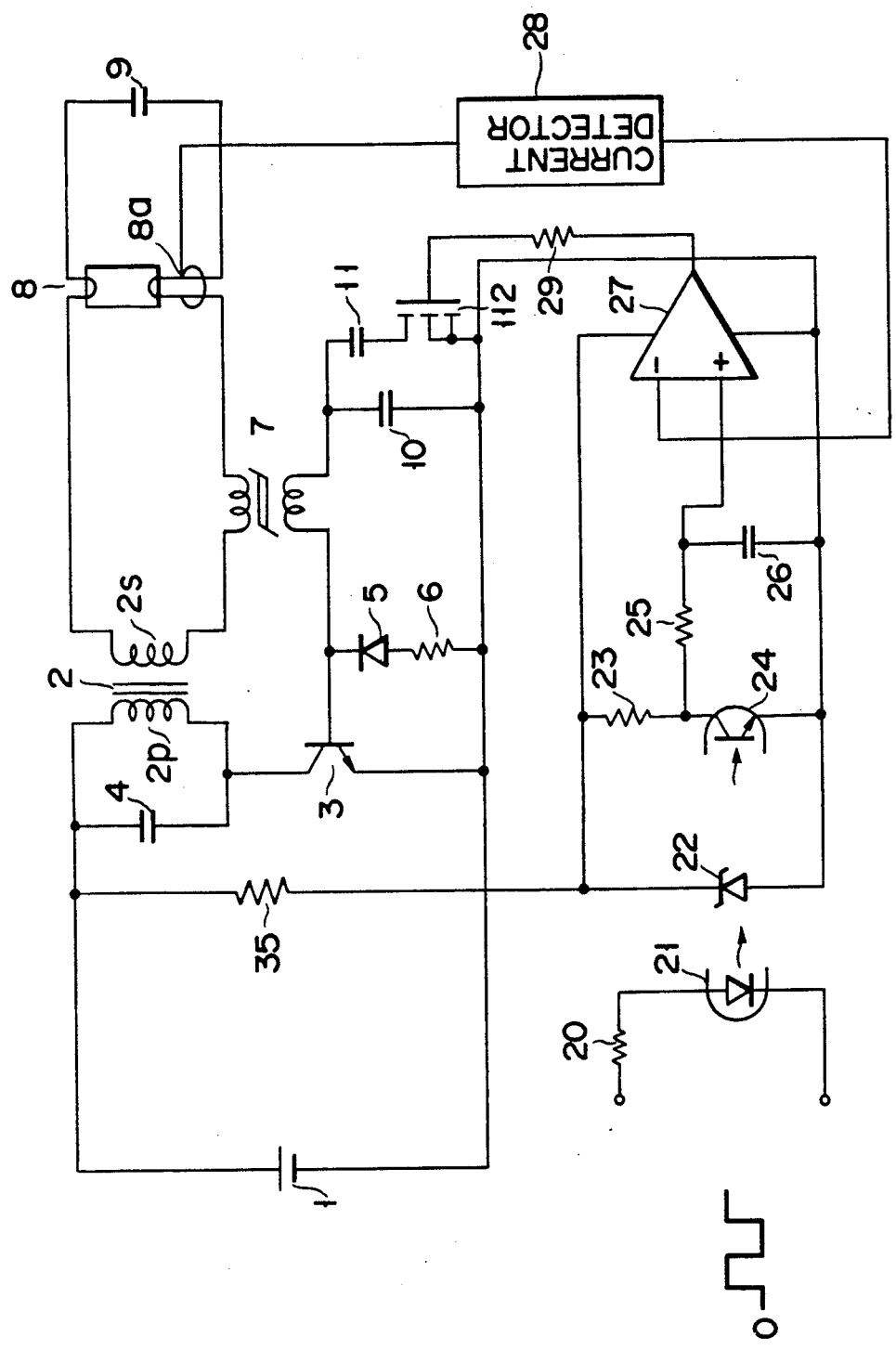
FIG. 4 is a circuit diagram representing a lighting control device having an inverter according to a third embodiment of this invention, which is a modification of the inverter shown in FIG. 3.

FIG. 4 illustrates a discharge lamp-lighting device having an inverter according to a third embodiment of the invention, which is a modification of the inverter shown in FIG. 3. The same components as those shown in FIG. 3 are designated at the same numerals, and will not be described in detail. In the third embodiment, a current detector 28 detects the current output from the current transformer 8a of a discharge lamp 8, and converts the current into a voltage. This voltage is applied to the inverting input of an operational amplifier 27. The voltage across a capacitor 26, which corresponds to the pulse width of a lighting-control signal, is applied to the non-inverting input of the operational amplifier 27. The operational amplifier 27 outputs a voltage which is the difference between the voltages applied to the inverting and non-inverting inputs. The output voltage of the operational amplifier 27 is applied to the gate of a FET 112. Therefore, the voltage corresponding to the output current of the lamp 8 is compared with the reference voltage corresponding to the pulse width of the lighting-control signal, and the difference between these compared voltages is negatively fed back to the discharge lamp 8, thereby controlling the lighting of the lamp 8.

FIG. 5 shows a discharge lamp-lighting device having an inverter according to a fourth embodiment of this invention. This embodiment comprises an inverter identical with the first embodiment shown in FIG. 1, and a series circuit comprised of an FET and a capacitor and connected in parallel to the inverter (FIG. 1). Capacitors 11 and 15 are connected to the drains of FETs 14 and 16, respectively. Drive sections 17 and 18 are connected to the gates of the FETs 14 and 16, respectively. Both drive sections 17 and 18 are connected to a control circuit 19. Because of this circuit structure, the power loss in the capacitor is reduced to a third. Hence, the equivalent resistance of the capacitor is proportionally reduced, and therefore the inverter is superior to the inverter shown in FIG. 1 in terms of switching characteristic.

In the embodiments described above, a saturable current transformer (CT) 7 is used for detecting the current flowing through the lamp 8 and positively feeding this current back to the base of the transistor 3. The feedback winding of this transformer 7 can be replaced by an inverter transformer or a ballast choke coil.

In the first, second and third embodiments, the control circuit 13 can control the impedance of the FET 112, thereby to maintain various physical quantities, such as currents and voltages at various circuit points of the operating inverter, the temperature of the lamp 8, and the luminance of the lamp 8. More specifically, the impedance of the FET 112 can be controlled, thus rendering the peak value $V_p$ of the collector voltage of the switching transistor 3 constant, whereby the voltage applied to the transistor 3 is limited, and no surge voltages are applied to the transistor 3. In this case, since the peak value $V_p$ is constant, the fluctuation of the AC voltage applied to the lamp 8 can be minimized even if the power-source voltage changes. Further, due to the control of the impedance of the FET 112, the inverter according to the invention can operate stably despite of the surges in the input voltage.

In the embodiments described above, a small-sized MOSFET 112 is used as a variable resistance element. This MOSFET can be replaced by, as is shown in FIG. 6, a bipolar transistor 61 by changing the circuit condition. In the inverter illustrated in FIG. 6, the base voltage of the bipolar transistor 61 is controlled by a control circuit 62. Alternatively, the MOSFET 112 can be replaced by a CdS element, in which case the impedance of the CdS element is controlled by changing the intensity of the light applied to this element.

As has been described, the inverter according to the present invention can provide a continuous output power control over a broad range, though it is a self-excited inverter. When the inverter is used in a device for lighting a discharge lamp, it can control the flux of the lamp, achieve the temperature-compensation for the lamp and the inverter, start the lamp smoothly, protect the lamp after a long use thereof, reduce the output voltage at the time of disconnecting the lamp from the device, output a desired voltage even if the components have characteristics different from the design values, and operate stably despite of the surges in the input voltage.

What is claimed is:

1. An apparatus for operating a fluorescent lamp comprising:
    a DC voltage source for supplying a DC voltage;
    a switching transistor for switching the DC voltage supplied from said DC voltage source;
    a parallel resonant circuit, including an inductor and a resonant capacitor, for receiving the DC voltage switched by said switching transistor and for generating an AC output, said resonant circuit being connected in series to said switching transistor and connected so as to be fed from said DC voltage source through said switching transistor;
    a filament warming capacitor, arranged between end portions of a filament of the fluorescent lamp which receives the AC output from said parallel resonant circuit for warming the filament, said end portions being on a side opposite to said parallel resonant circuit;
    self-excited oscillation means including a current transformer, a primary winding of which being connected in series between said fluorescent lamp and one of the output terminals of said parallel resonant circuit, for supplying an output of a secondary winding between the base and emitter of said switching transistor so as to control the ON and OFF condition of said switching transistor and for supplying a base current to said switching transistor;
    variable impedance means, connected to a base current supplying path and said self-excited oscillation means and including a series circuit composed of a variable resistance element and a second capacitor, for changing the resistance value of the variable resistance element and for changing a charge amount on said second capacitor, thereby to change the combined impedance value to change the ON period of said switching transistor;
    means for discharging an electric charge on said second capacitor during the OFF period of said switching transistor; and
    control means, connected to said variable impedance means, for continuously changing the resistance value of said variable resistance element, thereby to change the combined impedance of the variable impedance means to continuously change the ON period of said switching transistor.

2. The apparatus according to claim 1, wherein said variable impedance means further includes a third capacitor connected in parallel to said series circuit.

3. The apparatus according to claim 1, wherein said variable resistance element includes a field-effect transistor.

4. The apparatus according to claim 1, wherein said variable resistance element includes a bipolar transistor.

5. The apparatus according to claim 1, wherein said control means comprises detector means for detecting a voltage applied to said switching transistor and generating a detection voltage and a comparator means for comparing the detection voltage with a predetermined reference voltage, and for changing the resistance of said variable resistance element in accordance with the difference between the voltages compared.

6. An inverter comprising:
a DC voltage source for supplying a DC voltage;
a switching transistor for switching the DC voltage supplied from said DC voltage source;
a parallel resonant circuit, including an inductor and a resonant capacitor, for receiving the DC voltage switched by said switching transistor and for generating an AC output, said resonant circuit being connected in series to said switching transistor and connected so as to be fed from said DC voltage source through said switching transistor;
self-excited oscillation means including means for detecting at least part of the AC output from said resonant circuit, for supplying the detection output of the detecting means between the base and emitter of said switching transistor so as to control the ON and OFF condition of said switching transistor and for supplying a base current to said switching transistor;
variable impedance means, connected to said self-excited oscillation means and including a series circuit composed of a variable resistance element and a capacitor, for changing the resistance value of the variable resistance element, thereby to change the combined impedance value to change the ON period of said switching transistor; and
control means, connected to said variable impedance means, for continuously changing the resistance value of said variable resistance element, thereby to change the combined impedance of the variable impedance means to continuously change the ON period of said switching transistor, wherein said control means comprises lighting-control signal generating means for generating a lighting-control signal, and lighting-control means for receiving the lighting-control signal and changing the resistance value of the variable resistance element.

7. An inverter comprising:
a DC voltage source for supplying a DC voltage;
a switching transistor for switching the DC voltage supplied from said DC voltage source;
a parallel resonant circuit, including an inductor and a resonant capacitor, for receiving the DC voltage switched by said switching transistor and for generating an AC output, said resonant circuit being connected in series to said switching transistor and connected so as to be fed from said DC voltage source through said switching transistor;
self-excited oscillation means including means for detecting at least part of the AC output from said resonant circuit, for supplying the detection output of the detecting means between the base and emitter of said switching transistor so as to control the ON and OFF condition of said switching transistor and for supplying a base current to said switching transistor;
variable impedance means, connected to said self-excited oscillation means and including a series circuit composed of a variable resistance element and a capacitor, for changing the resistance value of the variable resistance element, thereby to change the combined impedance value to change the ON period of said switching transistor;
control means, connected to said variable impedance means, for continuously changing the resistance value of said variable resistance element, thereby to change the combined impedance of the variable impedance means to continuously change the ON period of said switching transistor; and
means for generating a load current,
wherein said control means comprises means for detecting the load current and generating a voltage signal corresponding to the load current, a light-emitting element for generating a lighting-control signal, a light-receiving element for receiving the lighting-control signal and generating an electrical signal, a capacitor for accumulating the electrical signal, and means for comparing the voltage signal corresponding to the load current with voltage generated by said capacitor.

8. An apparatus for operating a fluorescent lamp comprising:
a DC voltage source for supplying a DC voltage;
a switching transistor for switching the DC voltage supplied from said DC voltage source;
a parallel resonant circuit, including an inductor and a resonant capacitor, for receiving the DC voltage switched by said switching transistor and for generating an AC output, said resonant circuit being connected in series to said switching transistor and connected so as to be fed from said DC voltage source through said switching transistor;
a filament warming capacitor, arranged between end portions of a filament of the fluorescent lamp which receives the AC output from said parallel resonant circuit for warming the filament, said end portions being on a side opposite to said parallel resonant circuit;
self-excited oscillation means, including a current transformer, a primary winding of which being connected in series between said fluorescent lamp and one of the output terminals of said parallel resonant circuit, for supplying an output of a secondary winding between the base and emitter of said switching transistor so as to control the ON and OFF condition of said switching transistor and for supplying a base current to said switching transistor;
variable impedance means, connected to a supplying path for base current and to said self-excited oscillation means and including a first series circuit comprised of a first variable resistance element and a first capacitor and a second series circuit connected in parallel to the first series circuit and comprised of a second variable resistance element and a second capacitor, for changing the resistance values of the first and second variable resistance elements, and for changing a charge amount on said capacitor thereby to change the combined impedance value to change the ON period of said switching transistor;

means for discharging an electric charge on said capacitor during the OFF period of said switching transistor; and control means, connected to said variable impedance means, for continuously changing the resistance values of said first and second variable resistance elements, thereby to change the combined impedance of the variable impedance means to continuously change the ON period of said switching transistor.

9. The apparatus according to claim 8, wherein said variable impedance further includes another capacitor connected in parallel to said first and second series circuits.

10. The apparatus according to claim 8, wherein each of said first and second variable resistance elements include a field-effect transistor.

11. The apparatus according to claim 8, wherein said first and second variable resistance elements each include a bipolar transistor.

12. An inverter comprising:
a DC voltage source for supplying a DC voltage;
a switching transistor for switching the DC voltage supplied from said DC voltage source;
a parallel resonant circuit, including an inductor and a resonant capacitor, for receiving the DC voltage switched by said switching transistor and for generating an AC output, said resonant circuit being connected in series to said switching transistor and connected so as to be fed from said DC voltage source through said switching transistor;
self-excited oscillation means, including means for detecting at least part of the AC output from said resonant circuit, for supplying the detection output of the detecting means between the base and emitter of said switching transistor so as to control the ON and OFF condition of said switching transistor and for supplying a base current to said switching transistor;
variable impedance means, connected to said self-excited oscillation means and including a first series circuit comprised of a first variable resistance element and a first capacitor and a second series circuit connected in parallel to the first series circuit and comprised of a second variable resistance element and a second capacitor, for changing the resistance values of the first and second variable resistance elements, thereby to change the combined impedance value to change the ON period of said switching transistor; and
control means, connected to said variable impedance means, for continuously changing the resistance values of said first and second variable resistance elements, thereby to change the combined impedance of the variable impedance means to continuously change the ON period of said switching transistor, wherein said control means comprises lighting-control signal generating means for generating a lighting-control signal, and lighting-control means for receiving the lighting-control signal and changing the resistance values of the first and second variable resistance elements.

13. An inverter comprising:
a DC voltage source for supplying a DC voltage;
a switching transistor for switching the DC voltage supplied from said DC voltage source;
a parallel resonant circuit, including an inductor and a resonant capacitor, for receiving the DC voltage switched by said switching transistor and for generating an AC output, said resonant circuit being connected in series to said switching transistor and connected so as to be fed from said DC voltage source through said switching transistor;
self-excited oscillation means, including means for detecting at least part of the AC output from said resonant circuit, for supplying the detection output of the detecting means between the base and emitter of said switching transistor so as to control the ON and OFF condition of said switching transistor and for supplying a base current to said switching transistor;
variable impedance means, connected to said self-excited oscillation means and including a first series circuit comprised of a first variable resistance element and a first capacitor and a second series circuit connected in parallel to the first series circuit and comprised of a second variable resistance element and a second capacitor, for changing the resistance values of the first and second variable resistance elements, thereby to change the combined impedance value to change the ON period of said switching transistor;
control means, connected to said variable impedance means, for continuously changing the resistance values of said first and second variable resistance elements, thereby to change the combined impedance of the variable impedance means to continuously change the ON period of said switching transistor; and
means for generating a load current,
wherein said control means comprises means for detecting the load current and generating a voltage signal corresponding to the load current, a light-emitting element for generating a lighting-control signal, a light-receiving element for receiving the lighting-control signal and generating an electrical signal, a capacitor for accumulating the electrical signal, and means for comparing the voltage signal corresponding to the load current with a voltage generated by said capacitor.

14. The apparatus according to claim 8, wherein said control means comprises detector means for detecting a voltage applied to said switching transistor and generating a detection voltage and means for comparing the detection voltage with a predetermined reference voltage, and for changing the resistances of said first and second variable resistance elements in accordance with the difference between the voltages compared.

* * * * *

UNITED STATES PATENT AND TRADEMARK OFFICE
CERTIFICATE OF CORRECTION

PATENT NO. : 5,036,254
DATED : July 30, 1991
INVENTOR(S) : SHIMIZU

It is certified that error appears in the above-identified patent and that said Letters Patent is hereby corrected as shown below:

ON THE COVER PAGE:

Reads: [73] Assignee: Toshiba Lighting & Technology Group, Tokyo, Japan

Should Read: [73] Assignee: Toshiba Lighting & Technology Corporation, Tokyo, Japan Signed and Sealed this Twenty-ninth Day of December, 1992

*Attest:*

DOUGLAS B. COMER

*Attesting Officer*  Acting Commissioner of Patents and Trademarks